Feb. 28, 1950   R. W. BARRELL   2,499,176
RADIATOR COOLING SYSTEM, TEMPERATURE CONTROL
Filed Sept. 20, 1946
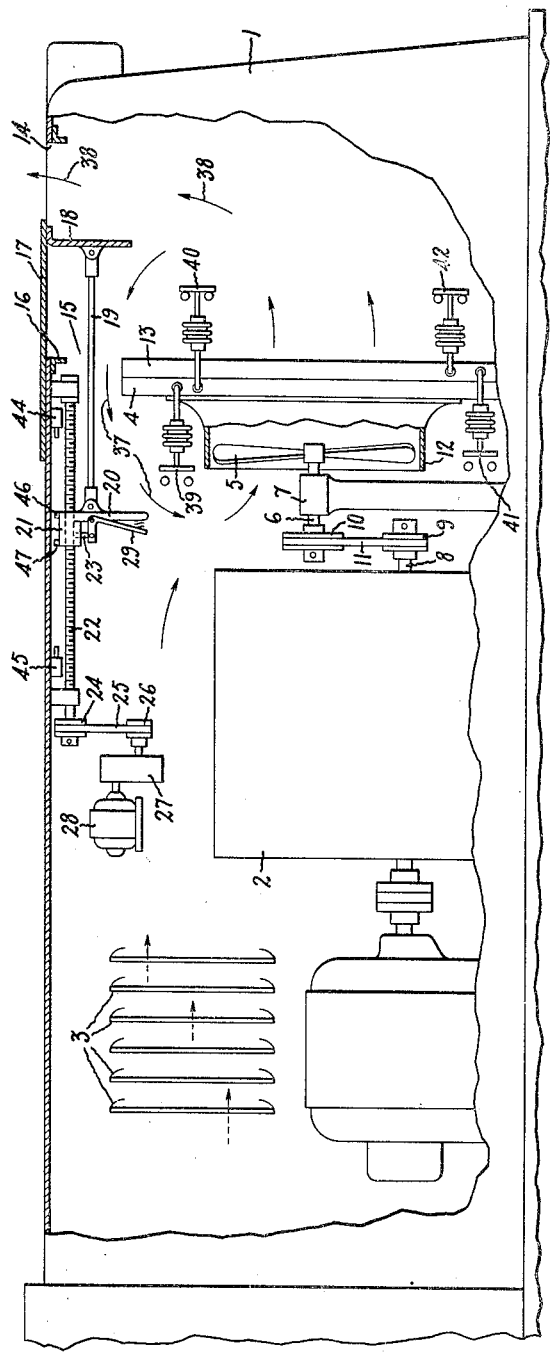
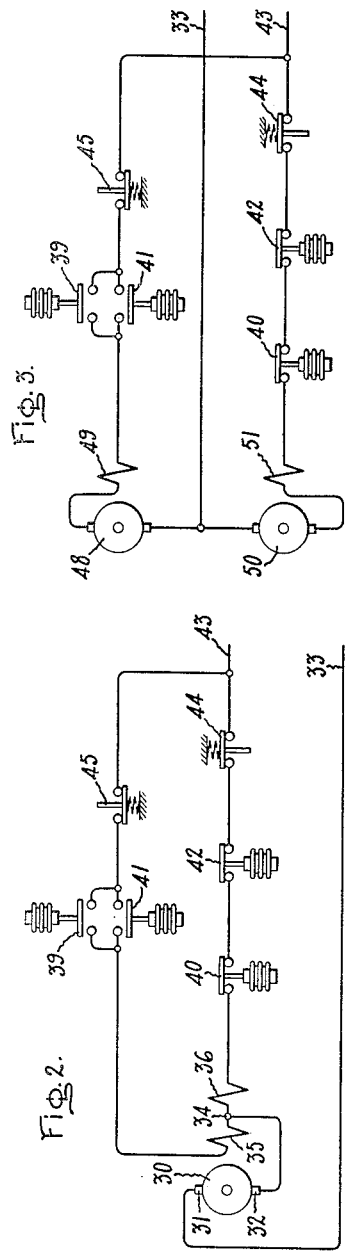
Inventor:
Robert W. Barrell,
by Browell S. Mack
His Attorney.

Patented Feb. 28, 1950

2,499,176

UNITED STATES PATENT OFFICE 2,499,176

RADIATOR COOLING SYSTEM, TEMPERATURE CONTROL

Robert W. Barrell, Erie, Pa., assignor to General Electric Company, a corporation of New York Application September 20, 1946, Serial No. 698,331

26 Claims. (Cl. 123—178)

My invention relates to power plants, particularly such as may be utilized for traction vehicles and to an improvement of the lubricant and cooling system for such power plants.

In power plants, particularly such as utilize internal combustion engines, it is desirable that the engine should attain a predetermined temperature at which it operates most efficiently and also that it should not exceed another predetermined higher temperature in order to prevent damage thereto. Also it is desirable that the lubricant in the lubricating system of such a power plant should be kept below a predetermined temperature to obtain its best lubricating properties and that it should not be too cold to prevent a desired fluidity, such that it will readily flow to all desired bearing surfaces.

An object of my invention is to provide an improved power plant having a lubricant system and a fluid cooling system which will maintain the lubricant and the cooling fluid at substantially the most desirable operating temperature.

Another object of my invention is to provide an improved cooling system adapted to be used with a power plant.

A further object of my invention is to provide an improved cooling system for a power plant lubrication system.

Further objects and advantages of my invention will become apparent and my invention will be better understood from the following description referring to the accompanying drawing, and the features of novelty which characterize my invention will be pointed out with particularity in the claims annexed to and forming part of this specification.

In the drawing, Fig. 1 is a side elevational view, partly broken away, schematically illustrating a power plant provided with an embodiment of my invention shown mounted in the nose of a traction vehicle such as a locomotive; Fig. 2 schematically illustrates the connection diagram for a control circuit which is adapted to be used in a construction such as that shown in Fig. 1; and Fig. 3 is a schematic diagram of the control circuit of another embodiment of my invention which may be used in a construction such as that shown in Fig. 1.

Referring to the drawing, I have shown an embodiment of my invention applied to a traction vehicle power plant mounted in the nose 1 of a vehicle such as a locomotive of the Diesel electric type. In such constructions, the prime mover which may comprise any suitable type of engine, such as a Diesel engine 2, is customarily provided with a lubricant system for suitably lubricating the various bearing surfaces of the engine and also is provided with a fluid cooling system to maintain the temperature of the engine at its most efficient operating value. With this type of equipment, air may be drawn into the compartment which forms an enclosure around the equipment through suitable openings, such as fixed louvers 3, and if this air is discharged to the outside atmosphere through other fixed openings, a quantity will be discharged which is equal to that which is drawn into the enclosure through the fixed louvers 3. In very warm ambient atmospheres, this may result in an overheating of the engine and an overheating of the lubricant in the lubricant system for the engine, and in relatively low temperature ambient atmospheres, the engine may tend to operate at a temperature which is lower than its most efficient value; and if it is provided with a fluid cooling system, this cooling system may require that an antifreeze solution be utilized or that some other provision be made to minimize the cooling effect thereon. In addition, it is quite possible that the lubricant in the lubricating system may become too cold, with a resultant lowering in its viscosity and corresponding lowering in its lubricant properties which in extreme cases may result in failure of certain parts of the engine. It is desirable, therefore, that the temperature of the lubricant, as well as the temperature of the engine, be maintained within a predetermined range. It is not necessary that the lubricant temperature and the cooling fluid temperature be the same, as the provision of the different types and sizes of heat exchangers may be utilized in accordance with the type of lubricant and cooling fluid which is used and in accordance with the relative ranges of temperatures for these two materials.

The lubricant system for the prime mover 2 in the illustrated arrangement is shown as provided with a heat exchanger 4 of any suitable type to provide for maintaining the desired range of operating temperatures for the lubricant of the system through a wide range of ambient temperatures. Lubricant may be circulated through this heat exchanger 4 in any conventional manner, and a ventilating fan or blower 5 is arranged to circulate ventilating medium formed by the surrounding atmosphere in the enclosure 1 through the heat exchanger 4 to maintain the lubricant temperature within the predetermined range. This ventilating medium impeller 5 may be driven in any suitable manner and is shown as mounted on a shaft 6 supported in a pedestal bearing 7 and adapted to be driven by a power takeoff shaft 8 operatively connected to the engine 2 and arranged to transmit power to the shaft 6 through any suitable drive, such as pulleys 9 and 10 and a belt 11. A ventilating medium shroud 12 is arranged around the impeller 5 in order to direct the ventilating medium more efficiently through the heat exchanger 4.

The operating temperature of the engine 2 also is adapted to be maintained within a predetermined operating range by a fluid cooling system which includes a heat exchanger 13 connected in the fluid cooling system in any suitable manner and arranged adjacent the lubricant heat exchanger 4 such that the ventilating medium which is blown through the heat exchanger 4 by the impeller 5 also functions to transfer heat between the cooling fluid in the heat exchanger 13 and the ventilating medium which passes therethrough under the action of the impeller 5.

In order to maintain the temperature of the lubricant and the temperature of the cooling fluid within the desired range, the enclosure around the power plant is provided with a controllable variable flow arrangement having an exhaust opening 14 through the enclosure 1, through which the ventilating medium which is blown through the heat exchanger may be exhausted from the enclosure. In some arrangement it may be found also desirable to provide a recirculating bypass passage, such as the opening 15 formed between the ends of the heat exchangers 4 and 13 and a baffle plate 16 secured to the upper portion of the enclosure 1. The flow of ventilating medium out of the exhaust opening 14 and recirculation of atmosphere through the heat exchangers 4 and 13 bypassing through the recirculating bypass 15 may be regulated by a control system which includes a closure formed by a cover or hatch 17, which is adapted to vary the size of the exhaust opening 14, and, where a recirculation also is used, by a baffle plate 18 secured to the hatch 17 and adapted to vary the effective opening for the recirculation of ventilating medium through the bypass passage 15. This construction of a unitary closure member for the exhaust opening 14 and the bypass 15 provides for simultaneously and inversely varying the exhaust and recirculation of the ventilating atmosphere through the heat exchangers by simultaneously and inversely varying the sizes of these two openings. In order to provide for the desired positioning of the closure member, an operating rod 19 is pivotally mounted on the baffle plate 18 and is secured to a suitable positioning member 20 which is formed with a follower gear engaging element 21 adapted to be operated automatically by a worm gear 22 by engagement of a follower latch element 23 arranged in engagement with the thread of the worm gear 22. This worm gear 22 is arranged to drive the positioning member 20 in either direction to open or close either of the openings and is actuated through a suitable driving system which is shown as including a driving pulley 24 operably connected by a suitable belt 25 to another pulley 26 which is adapted to be driven by suitable reduction gears in a gear housing 27 actuated by suitable power driving means which may comprise an electric motor drive 28. This electric motor drive may be in the form of a single motor of the reversible type having a pair of field exciting windings for providing opposite excitation to the motor for rotation in opposite directions to drive the positioning member 20 and, therefore, the closure member in opposite directions, alternately for driving the positioning member 20 in one or the other direction as determined by the temperatures of the lubricant in the heat exchanger 4 or the cooling fluid in the heat exchanger 13. Under certain circumstances it may be found desirable to position the closure member by manual operation, and this may be done in any suitable way as shown by depressing a release handle 29 on the positioning member 20 which unlatches the thread-engaging element 23 and permits movement of the positioning member 20 to any desired position within the range of full-open to full-closed position for either the exhaust opening 14 or the bypass opening 15.

It is desirable that under normal operating conditions the closure member should be operated responsive to temperature of lubricant and cooling fluid in the heat exchangers 4 and 13, and preferably this should be attained by an automatic control. This may be done by any suitable control circuit, and Fig. 2 illustrates one control system for attaining this result in which the electric motor drive is shown as comprising a single motor having an armature 30 of any conventional type to which power is adapted to be supplied through suitable contact brush elements 31 and 32 connected respectively to a source of electric power supply line 33 and a common terminal 34 of a pair of field exciting windings 35 and 36 for the motor. These field exciting windings 35 and 36 are adapted to provide opposite excitation to the motor to obtain opposite directions of rotation of the armature 30 for driving the closure member in opposite directions in response to predetermined temperature conditions of the lubricant and cooling fluid in the heat exchangers 4 and 13. Under normal operating conditions, it may be desirable that the cooling fluid, such as water, be held within a range of between 160 and 180° F., and that the lubricant, such as oil, should be maintained at a temperature of between about 140 and 160° F. In order to obtain these ranges of temperature, the motor circuit is adapted to be opened and closed in such a manner as to actuate the closure member to provide for more or less recirculation of the ventilating atmosphere through the heat exchangers, as shown by the arrows 37, and more or less of the exhaust of this ventilating atmosphere through the exhaust opening 14, as indicated by the arrows 38. This temperature control is obtained by providing a pair of thermostatically controlled circuit breakers 39 and 40 responsive to the temperature of lubricant in the heat exchanger 4 and a pair of thermostatically controlled circuit breakers 41 and 42 responsive to the temperature of cooling fluid in the heat exchanger 13. One of the thermostatically responsive circuit breakers 40 in the lubricant system heat exchanger 4 and one of the thermostatically controlled circuit breakers 42 in the cooling fluid heat exchanger are connected in series with the field exciting winding 35 and to one side of the electrical source of power supply 43 through a limit circuit breaker 44 normally biased to closed circuit position. The thermostatically controlled circuit breaker 39 in the lubricant heat exchanger 4 and the thermostatically controlled circuit breaker 41 in the heat exchanger 13 are connected in parallel with each other and in series with the field exciting winding 36 and a limit circuit breaker 45 to the same side of the line 43 as the other thermostatically controlled circuit breakers 40 and 42. In order to maintain the various temperatures within the desired ranges, the thermostatically controlled circuit breakers will be set or selected to operate such that the circuit breaker 39 will open at 150° F. and will close at 160° F., while the circuit breaker 40 will open at 150° F. and close at 140° F.; whereas the circuit breakers in the fluid cooling heat exchanger 13 are set or selected to operate so that the circuit breaker 41 will open at 170° F. and close at 180° F., while the circuit breaker 42 will open at 170° F. and close at 160° F. and are connected as explained above to provide the desired operating temperature ranges for the lubricant and the cooling fluid.

With this arrangement, if the engine 2 is cold and the closure is moved to such a position that the hatch 17 tightly closes the opening 14, such that all of the ventilating medium which passes through the heat exchangers will be recirculated through the bypass 15, the limit circuit breaker 44 will be opened by being biased in open position by an operating finger 46 on the positioning member 20 and the temperature will be assumed to be below 140°, so that the circuit breakers 40 and 42 will be closed and the circuit breakers 39 and 41 will be open. As the engine 2 operates, the temperature of the lubricant and the temperature of the cooling fluid will be raised, and if the temperature of the lubricant reaches 150° F., the circuit breaker 40 will be opened and the circuit breaker 39 will remain open until the temperature of the lubricant reaches its maximum desired temperature of about 160° F. when the circuit breaker 39 will close. Similarly, the cooling fluid of the engine will be heated by the engine and very little heat will be dissipated in the heat exchanger 13 as the ventilating atmosphere will generally be recirculated, as indicated by the arrows 37, through the bypass 15 until the temperature of the cooling fluid reaches about 170° F. when the circuit breaker 42 will be opened, and with further rise in temperature of the cooling fluid to about 180° F., the circuit breaker 41 will be closed. When either of the circuit breakers 39 or 41 are closed, indicating that either the temperature of the lubricant or the temperature of the cooling fluid in the heat exchangers 4 and 13, respectively, has reached its maximum desired value, a circuit will be completed through such closed circuit breaker 39 or 41 and the normally closed limit circuit breaker 45, thereby energizing the field exciting winding 36 and the motor armature 30, causing the motor to operate in such a direction as to actuate the positioning member 20 and cause it to move towards an open exhaust position and a closed recirculating position. It is desirable that the speed at which the closure member is operated should be somewhat greater than the maximum rate which the water and oil temperatures will change to the highest or lowest permissible temperature, so that the closure member will always reach its extreme position before the water or oil can reach prohibitive temperatures. On the other hand, if after the closure member has partially opened the exhaust opening and the water or oil temperature drops rapidly, the circuit breakers 39 or 41 will open, and if the other of these circuit breakers also is in its open position, the closure member will remain at intermediate positions, with both the recirculating bypass and the exhaust openings partly open. If the temperatures continue to drop because the hatch 17 of the closure is too far open, the circuit breakers 40 and 42 will close, and when both of these circuit breakers are closed, the field exciting winding 35 and the armature 30 will be energized to operate the motor in the opposite direction for actuation of the positioning member 20 toward closed exhaust position and open recirculating position. This actuation, however, will occur only when the temperatures of both the lubricant and the cooling fluid in the heat exchangers are below their minimum predetermined desirable operating values. If the temperature of the lubricant or the cooling fluid reach such a value as to require a completely closed recirculating bypass 15 and a completely open exhaust passage 14, the operating member 20 will reach its limiting position and an actuating finger 47 will bias the circuit breaker 45 to its open circuit position, thereby deenergizing the motor armature 30 and field 36 and preventing further actuation of the positioning member 20 by removal of the driving power therefrom. Thus, the thermostatically controlled circuit breakers 39, 40, 41, and 42 will automatically control the operation of the closure member by actuation of its positioning member 20 to provide for the desired recirculation and proportionate exhaust of the ventilating atmosphere through the heat exchangers 4 and 13, and movement of the closure member to either its full open position of the exhaust opening or of the recirculating bypass will deenergize the actuating motor and remove its driving power from the positioning member 20, thus limiting the travel of the closure member. A more simple arrangement may be obtained by omitting the recirculation regulation feature and by only controlling the atmospheric exhaust opening.

In Fig. 3, I have shown a variation of the circuit shown in Fig. 2 for the actuation of the positioning member 20 by the provision of a pair of electric motors. It will be understood that such motors are coupled together and to the load and that one will be energized for one direction of drive rotation and the other will be energized for the opposite direction of drive rotation to take the place of the reversible single motor drive 28 shown in Fig. 1. With this arrangement, one of the motors is provided with an armature 48 and a field exciting winding 49 which is adapted to provide excitation to the armature 48 when it is energized through the limit switch 45 and either of the thermostatically controlled circuit breakers 39 or 41 to actuate the closure positioning member 20 towards open exhaust position and closed bypassed position, and a second motor is provided having an armature 50 and a field exciting winding 51 which is adapted to be energized by closure of the circuit breakers 40 and 42 in series with the limit circuit breaker 44 for actuation of the closure positioning member 20 towards closed exhaust position and open bypass recirculating position. The operation of the various circuit breakers and the actuating mechanism is the same as that described with respect to the system shown in Fig. 2. In both of the control circuits the thermostatic circuit breakers may be connected to control main line relays if desired instead of acting directly in the motor circuits.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. A cooling system for a lubricant system including a heat exchanger for cooling lubricant in said system, means for simultaneously and inversely varying the exhaust and recirculation of atmosphere through said heat exchanger, and means responsive to temperature of lubricant in said lubricant system for increasing the exhaust and reducing the recirculation of atmosphere through said heat exchanger above a predetermined temperature of lubricant in said lubricant system and decreasing the exhaust and increasing the recirculation of atmosphere through said heat exchanger below a predetermined temperature of lubricant in said lubricant system.

2. A cooling system for a power plant with a lubricant system and a fluid cooling system, said lubricant system including a heat exchanger for cooling lubricant in said system, said fluid cooling system including a heat exchanger for cooling fluid in said fluid cooling system, means for varying the exhaust of atmosphere through said heat exchangers, and means responsive to temperature of lubricant and cooling fluid in said systems for increasing the exhaust of atmosphere through said heat exchangers above predetermined temperatures of either lubricant or cooling fluid in said systems and decreasing the exhaust of atmosphere through said heat exchangers below predetermined temperatures of both lubricant and cooling fluid in said systems.

3. A cooling system for a power plant with a lubricant system and a fluid cooling system, said lubricant system including a heat exchanger for cooling lubricant in said system, said fluid cooling system including a heat exchanger for cooling fluid in said fluid cooling system, means for simultaneously and inversely varying the exhaust and recirculation of atmosphere through said heat exchangers, and means responsive to temperature of lubricant and cooling fluid in said systems for increasing the exhaust and reducing the recirculation of atmosphere through said heat exchangers above predetermined temperatures of either lubricant or cooling fluid in said systems and decreasing the exhaust and increasing the recirculation of atmosphere through said heat exchangers below predetermined temperatures of both lubricant and cooling fluid in said systems.

4. A cooling system for a fluid cooling system including a heat exchanger for cooling fluid in said fluid cooling system, means for simultaneously and inversely varying the exhaust and recirculation of atmosphere through said heat exchanger, and means responsive to temperature of cooling fluid in said heat exchanger for increasing the exhaust and reducing the recirculation of atmosphere through said heat exchanger above a predetermined temperature of cooling fluid in said heat exchanger and decreasing the exhaust and increasing the recirculation of atmosphere through said heat exchanger below a predetermined temperature of cooling fluid in said heat exchanger.

5. A cooling system for a lubricant system including a heat exchanger for cooling lubricant in said system, means for simultaneously and inversely varying the exhaust and recirculation of atmosphere through said heat exchanger, and means responsive to temperature of lubricant in said heat exchanger for increasing the exhaust and reducing the recirculation of atmosphere through said heat exchanger above a predetermined temperature of lubricant in said heat exchanger and decreasing the exhaust and increasing the recirculation of atmosphere through said heat exchanger below a predetermined temperature of lubricant in said heat exchanger.

6. A cooling system for a power plant with a lubricant system and a fluid cooling system, said lubricant system including a heat exchanger for cooling lubricant in said system, said fluid cooling system including a heat exchanger for cooling fluid in said fluid cooling system, means for varying the exhaust of atmosphere through said heat exchangers, and means responsive to temperature of lubricant and cooling fluid in said heat exchangers for increasing the exhaust of atmosphere through said heat exchangers above predetermined temperatures of either lubricant or cooling fluid in said heat exchangers and decreasing the exhaust of atmosphere through said heat exchangers below predetermined temperatures of both lubricant and cooling fluid in said heat exchangers.

7. A cooling system for a power plant with a lubricant system and a fluid cooling system, said lubricant system including a heat exchanger for cooling lubricant in said system, said fluid cooling system including a heat exchanger for cooling fluid in said fluid cooling system, means for simultaneously and inversely varying the exhaust and recirculation of atmosphere through said heat exchangers, and means responsive to temperature of lubricant and cooling fluid in said heat exchangers for increasing the exhaust and reducing the recirculation of atmosphere through said heat exchangers above predetermined temperatures of either lubricant or cooling fluid in said heat exchangers and decreasing the exhaust and increasing the recirculation of atmosphere through said heat exchangers below predetermined temperatures of both lubricant and cooling fluid in said heat exchangers.

8. A power plant including a prime mover with a fluid cooling system, said fluid cooling system including a heat exchanger for cooling fluid in said fluid cooling system, means including a controllable variable flow arrangement for regulating the exhaust and recirculation of atmosphere through said heat exchanger, said flow control arrangement including means for simultaneously and inversely varying the exhaust and recirculation of atmosphere through said heat exchanger, means responsive to temperature of cooling fluid in said heat exchanger for automatically operating said flow control arrangement means toward open exhaust position and closed recirculating position above a predetermined temperature of cooling fluid in said heat exchanger and toward closed exhaust position and open recirculating position below a predetermined temperature of cooling fluid in said heat exchanger.

9. A power plant including a prime mover with a lubricant system, said lubricant system including a heat exchanger for cooling lubricant in said system, means including a controllable variable flow arrangement for regulating the exhaust and recirculation of atmosphere through said heat exchanger, said flow control arrangement including means for simultaneously and inversely varying the exhaust and recirculation of atmosphere through said heat exchanger, means responsive to temperature of lubricant in said heat exchanger for automatically operating said flow control arrangement means toward open exhaust position and closed recirculating position above a predetermined temperature of lubricant in said heat exchanger and toward closed exhaust position and open recirculating position below a predetermined temperature of lubricant in said heat exchanger.

10. A fluid cooling system including a heat exchanger for cooling fluid in said fluid cooling system, means including an enclosure around said heat exchanger with a controllable variable flow arrangement having an exhaust opening for regulating the exhaust of atmosphere through said heat exchanger, said flow control means including a closure for said exhaust opening for varying the exhaust of atmosphere through said heat exchanger, means for positioning said closure, electric motor means for operating said closure positioning means, means including a thermostatic control for energizing said motor means for operation of said closure positioning means toward open exhaust position of said closure in response to temperatures higher than a predetermined value of cooling fluid in said heat exchanger, and means including a thermostatic control for energizing said motor means for operation of said closure positioning means toward closed exhaust position below a predetermined temperature of cooling fluid in said heat exchanger.

11. A traction vehicle power plant including a prime mover with a lubricant system and a fluid cooling system, said lubricant system including a heat exchanger for cooling lubricant in said system, said fluid cooling system including a heat exchanger for cooling fluid in said fluid cooling system, means including a controllable variable flow arrangement for regulating the exhaust and recirculation of atmosphere through said heat exchangers, said flow control arrangement including means for simultaneously and inversely varying the exhaust and recirculation of atmosphere through said heat exchangers, means responsive to temperature of lubricant and cooling fluid in said heat exchangers for automatically operating said flow control arrangement means toward open exhaust position and closed recirculating position above a predetermined temperature of either lubricant or cooling fluid in said heat exchangers and toward closed exhaust position and open recirculating position below a predetermined temperature of both lubricant and cooling fluid in said heat exchangers.

12. A power plant including a prime mover with a lubricant system, said lubricant system including a heat exchanger for cooling lubricant in said system, means including an enclosure around said heat exchanger with a controllable variable flow arrangement having an exhaust opening for regulating the exhaust of atmosphere through said heat exchanger, said flow control means including a closure for said exhaust opening for varying the exhaust of atmosphere through said heat exchanger, means for positioning said closure, means for manually operating said closure positioning means, means responsive to temperature of lubricant in said heat exchanger for automatically operating said closure positioning means toward open exhaust position above a predetermined temperature of lubricant in said heat exchanger and toward closed exhaust position below a predetermined temperature of lubricant in said heat exchanger, and means for removing driving power from said automatic operating means on operation of said closure to a full open position of said exhaust opening.

13. A power plant including a prime mover with a lubricant system, said lubricant system including a heat exchanger for cooling lubricant in said system, means including an enclosure around said heat exchanger with a controllable variable flow arrangement having an exhaust opening and a recirculating bypass for regulating the exhaust and recirculation of atmosphere through said heat exchanger, said flow control means including a closure for said exhaust opening and recirculating bypass for simultaneously and inversely varying the exhaust and recirculation of atmosphere through said heat exchanger, means for positioning said closure, means responsive to temperature of lubricant in said heat exchanger for operating said closure positioning means toward open exhaust position and closed recirculating position above a predetermined temperature of lubricant in said heat exchanger and toward closed exhaust position and open recirculating position below a predetermined temperature of lubricant in said heat exchanger, and means for removing driving power from said operating means on operation of said closure to a full open position of said exhaust opening or of said recirculating bypass.

14. A fluid cooling system including a heat exchanger for cooling fluid in said fluid cooling system, means including an enclosure around said heat exchanger with a controllable variable flow arrangement having an exhaust opening and a recirculating bypass for regulating the exhaust and recirculation of atmosphere through said heat exchanger, said flow control means including a closure for said exhaust opening and recirculating bypass for simultaneously and inversely varying the exhaust and recirculation of atmosphere through said heat exchanger, means for positioning said closure, electric motor means for operating said closure positioning means, means including a thermostatic control for energizing said motor means for operation of said closure positioning means toward open exhaust position and closed recirculating position of said closure in response to temperatures higher than a predetermined value of cooling fluid in said heat exchanger, and means including a thermostatic control for energizing said motor means for operation of said closure positioning means toward closed exhaust position and open recirculating position below a predetermined temperature of cooling fluid in said heat exchanger.

15. A power plant including a prime mover with a lubricant system and a fluid cooling system, said lubricant system including a heat exchanger for cooling lubricant in said system, said fluid cooling system including a heat exchanger for cooling fluid in said fluid cooling system, means including an enclosure around said heat exchangers with a controllable variable flow arrangement having an exhaust opening and a recirculating bypass for regulating the exhaust and recirculation of atmosphere through said heat exchangers, said flow control means including a closure for said exhaust opening and recirculating bypass for simultaneously and inversely varying the exhaust and recirculation of atmosphere through said heat exchangers, means for positioning said closure, and means responsive to temperature of lubricant and cooling fluid in said heat exchangers for operating said closure positioning means toward open exhaust position and closed recirculating position above a predetermined temperature of either lubricant or cooling fluid in said heat exchangers and toward closed exhaust position and open recirculating position below a predetermined temperature of both lubricant and cooling fluid in said heat exchangers.

16. A cooling system for a power plant with a lubricant system and a fluid cooling system, said lubricant system including a heat exchanger for cooling lubricant in said system, said fluid cooling system including a heat exchanger for cooling fluid in said fluid cooling system, means including a controllable variable flow arrangement having an exhaust opening and a recirculating bypass for regulating the exhaust and recirculation of atmosphere through said heat exchangers, said flow control means including a closure for said exhaust opening and recirculating bypass for simultaneously and inversely varying the exhaust and recirculation of atmosphere through said heat exchangers, means responsive to temperature of lubricant and cooling fluid in said heat exchangers for operating said closure toward open exhaust position and closed recirculating position above a predetermined temperature of either lubricant or cooling fluid in said heat exchangers and toward closed exhaust position and open recirculating position below a predetermined temperature of both lubricant and cooling fluid in said heat exchangers, and means for removing driving power from said operating means on operation of said closure to a full open position of said exhaust opening or of said recirculating bypass.

17. A power plant including a prime mover with a lubricant system, said lubricant system including a heat exchanger for cooling lubricant in said system, means including an enclosure around said heat exchanger with a controllable variable flow arrangement having an exhaust opening and a recirculating bypass for regulating the exhaust and recirculation of atmosphere through said heat exchanger, said flow control means including a closure for said exhaust opening and recirculating bypass for simultaneously and inversely varying the exhaust and recirculation of atmosphere through said heat exchanger, means for positioning said closure, means for manually operating said closure positioning means, means responsive to temperature of lubricant in said heat exchanger for automatically operating said closure positioning means toward open exhaust position and closed recirculating position above a predetermined temperature of lubricant in said heat exchanger and toward closed exhaust position and open recirculating position below a predetermined temperature of lubricant in said heat exchanger, and means for removing driving power from said automatic operating means on operation of said closure to a full open position of said exhaust opening or of said recirculating bypass.

18. A power plant including a prime mover with a lubricant system and a fluid cooling system, said lubricant system including a heat exchanger for cooling lubricant in said system, said fluid cooling system including a heat exchanger for cooling fluid in said fluid cooling system, means including an enclosure around said heat exchangers with a controllable variable flow arrangement having an exhaust opening and a recirculating bypass for regulating the exhaust and recirculation of atmosphere through said heat exchangers, said flow control means including a closure for said exhaust opening and recirculating bypass for simultaneously and inversely varying the exhaust and recirculation of atmosphere through said heat exchangers, means for positioning said closure, means responsive to temperature of lubricant and cooling fluid in said heat exchangers for operating said closure positioning means toward open exhaust position and closed recirculating position above a predetermined temperature of either lubricant or cooling fluid in said heat exchangers and toward closed exhaust position and open recirculating position below a predetermined temperature of both lubricant and cooling fluid in said heat exchangers, and means for removing driving power from said operating means on operation of said closure to a full open position of said exhaust opening or of said recirculating bypass.

19. A power plant including a prime mover with a fluid cooling system, said fluid cooling system including a heat exchanger for cooling fluid in said fluid cooling system, means including an enclosure around said heat exchanger with a controllable variable flow arrangement having an exhaust opening and a recirculating bypass for regulating the exhaust and recirculation of atmosphere through said heat exchanger, said flow control means including a closure for said exhaust opening and recirculating bypass for simultaneously and inversely varying the exhaust and recirculation of atmosphere through said heat exchanger, means for positioning said closure, means for manually operating said closure positioning means, means responsive to temperature of cooling fluid in said heat exchanger for automatically operating said closure positioning means toward open exhaust position and closed recirculating position above a predetermined temperature of cooling fluid in said heat exchanger and toward closed exhaust position and open recirculating position below a predetermined temperature of cooling fluid in said heat exchanger, and means for removing driving power from said automatic operating means on operation of said closure to a full open position of said exhaust opening or of said recirculating bypass.

20. A traction vehicle power plant including a prime mover with a lubricant system and a fluid cooling system, said lubricant system including a heat exchanger for cooling lubricant in said system, said fluid cooling system including a heat exchanger for cooling fluid in said fluid cooling system, means including an enclosure around said heat exchangers with a controllable variable flow arrangement having an exhaust opening and a recirculating bypass for regulating the exhaust and recirculation of atmosphere through said heat exchangers, said flow control means including a closure for said exhaust opening and recirculating bypass for simultaneously and inversely varying the exhaust and recirculation of atmosphere through said heat exchangers, means for positioning said closure, means for manually operating said closure positioning means, means responsive to temperature of lubricant and cooling fluid in said heat exchangers for automatically operating said closure positioning means toward open exhaust position and closed recirculating position above a predetermined temperature of either lubricant or cooling fluid in said heat exchangers and toward closed exhaust position and open recirculating position below a predetermined temperature of both lubricant and cooling fluid in said heat exchangers, and means for removing driving power from said automatic operating means on operation of said closure to a full open position of said exhaust opening or of said recirculating bypass.

21. A power plant including a prime mover with a lubricant system and a fluid cooling system, said lubricant system including a heat exchanger for cooling lubricant in said system, said fluid cooling system including a heat exchanger for cooling fluid in said fluid cooling system, means including an enclosure around said heat exchangers with a controllable variable flow arrangement having an exhaust opening and a recirculating bypass for regulating the exhaust and recirculation of atmosphere through said heat exchanger, said flow control means including a closure for said exhaust opening and recirculating bypass for simultaneously and inversely varying the exhaust and recirculation of atmosphere through said heat exchangers, means for positioning said closure, electric motor means for operating said closure positioning means, means including a thermostatic control for energizing said motor means for operation of said closure positioning means toward open exhaust position and closed recirculating position of said closure in response to temperatures higher than predetermined values for either lubricant or cooling fluid in said heat exchangers, and means including a thermostatic control for energizing said motor means for operation of said closure positioning means toward closed exhaust position and open recirculating position below predetermined temperatures of both lubricant and cooling fluid in said heat exchangers.

22. A power plant including a prime mover with a lubricant system and a fluid cooling system, said lubricant system including a heat exchanger for cooling lubricant in said system, said fluid cooling system including a heat exchanger for cooling fluid in said fluid cooling system, means including an enclosure around said heat exchangers with a controllable variable flow arrangement having an exhaust opening and a recirculating bypass for regulating the exhaust and recirculation of atmosphere through said heat exchangers, said flow control means including a closure for said exhaust opening and recirculating bypass for simultaneously and inversely varying the exhaust and recirculation of atmosphere through said heat exchangers, means for positioning said closure, electric motor means for operating said closure positioning means, means including a thermostatic control for energizing said motor means for operation of said closure positioning means toward open exhaust position and closed recirculating position of said closure in response to temperatures higher than a predetermined value for either lubricant or cooling fluid in said heat exchangers, means including a thermostatic control for energizing said motor means for operation of said closure positioning means toward closed exhaust position and open recirculating position below a predetermined temperature of both lubricant and cooling fluid in said heat exchangers, and limit circuit breakers for deenergizing said motor means on operation of said closure to full open position of said exhaust opening or of said recirculating bypass.

23. A power plant including a prime mover with a lubricant system, said lubricant system including a heat exchanger for cooling lubricant in said system, means including an enclosure around said heat exchanger with a controllable variable flow arrangement having an exhaust opening and a recirculating bypass for regulating the exhaust and recirculation of atmosphere through said heat exchanger, said flow control means including a closure for said exhaust opening and recirculating bypass for simultaneously and inversely varying the exhaust and recirculation of atmosphere through said heat exchanger, means for positioning said closure, means for operating said closure positioning means including a reversible electric motor having a pair of field exciting windings for providing opposite excitation to said motor, means including a thermostatic control for energizing one of said motor field exciting windings to excite said motor for operation of said closure positioning means toward open exhaust position and closed recirculating position of said closure in response to temperatures higher than a predetermined value for lubricant in said heat exchanger, means including a thermostatic control for energizing the other of said field exciting windings to excite said motor for operation of said closure positioning means toward closed exhaust position and open recirculating position below a predetermined temperature of lubricant in said heat exchanger, and limit circuit breakers for deenergizing said motor on operation of said closure to full open position of said exhaust opening or of said recirculating bypass.

24. A traction vehicle power plant including a prime mover with a lubricant system and a fluid cooling system, said lubricant system including a heat exchanger for cooling lubricant in said system, said fluid cooling system including a heat exchanger for cooling fluid in said fluid cooling system, means including an enclosure around said heat exchangers with a controllable variable flow arrangement having an exhaust opening and a recirculating bypass for regulating the exhaust and recirculation of atmosphere through said heat exchangers, said flow control means including a closure for said exhaust opening and recirculating bypass for simultaneously and inversely varying the exhaust and recirculation of atmosphere through said heat exchangers, means for positioning said closure, means for manually operating said closure positioning means, means for operating said closure positioning means including a reversible electric motor having a pair of field exciting windings for providing opposite excitation to said motor, means including a thermostatic control for energizing one of said motor field exciting windings to excite said motor for operation of said closure positioning means toward open exhaust position and closed recirculating position of said closure in response to temperatures higher than a predetermined value for either lubricant or cooling fluid in said heat exchangers, means including a thermostatic control for energizing the other of said field exciting windings to excite said motor for operation of said closure positioning means toward closed exhaust position and open recirculating position below a predetermined temperature of both lubricant and cooling fluid in said heat exchangers, and limit circuit breakers for deenergizing said motor on operation of said closure to full open position of said exhaust opening or of said recirculating bypass.

25. A power plant including a prime mover with a lubricant system and a fluid cooling system, said lubricant system including a heat exchanger for cooling lubricant in said system, said fluid cooling system including a heat exchanger for cooling fluid in said fluid cooling system, means including an enclosure around said heat exchangers with a controllable variable flow arrangement having an exhaust opening and a recirculating bypass for regulating the exhaust and recirculation of atmosphere through said heat exchangers, said flow control means including a closure for said exhaust opening and recirculating bypass for simultaneously and inversely varying the exhaust and recirculation of atmosphere through said heat exchangers, means for positioning said closure, means for operating said closure positioning means including a pair of electric motors operable in opposite directions, means including a thermostatic control for energizing one of said motors for operation of said closure positioning means toward open exhaust position and closed recirculating position of said closure in response to temperatures higher than a predetermined value for either lubricant or cooling fluid in said heat exchangers, and means including a thermostatic control for energizing the other of said motors for operation of said closure positioning means toward closed exhaust position and open recirculating position below a predetermined temperature of both lubricant and cooling fluid in said heat exchangers.

26. A power plant including a prime mover with a lubricant system and a fluid cooling system, said lubricant system including a heat exchanger for cooling lubricant in said system, said fluid cooling system including a heat exchanger for cooling fluid in said fluid cooling system, means including an enclosure around said heat exchangers with a controllable variable flow arrangement having an exhaust opening and a recirculating bypass for regulating the exhaust and recirculation of atmosphere through said heat exchangers, said flow control means including a closure for said exhaust opening and recirculating bypass for simultaneously and inversely varying the exhaust and recirculation of atmosphere through said heat exchangers, means for positioning said closure, means for manually operating said closure positioning means, means for operating said closure positioning means including a pair of electric motors operable in opposite directions, means including a thermostatic control for energizing one of said motors for operation of said closure positioning means toward open exhaust position and closed recirculating position of said closure in response to temperatures higher than a predetermined value for either lubricant or cooling fluid in said heat exchangers, means including a thermostatic control for energizing the other of said motors for operation of said closure positioning means toward closed exhaust position and open recirculating position below a predetermined temperature of both lubricant and cooling fluid in said heat exchangers, and limit circuit breakers for deenergizing said motors on operation of said closure to full open position of said exhaust opening or of said recirculating bypass.

ROBERT W. BARRELL.

REFERENCES CITED

The following references are of record in the file of this patent:

UNITED STATES PATENTS

| Number | Name | Date |
| --- | --- | --- |
| 1,352,509 | Griswold | Sept. 12, 1920 |
| 1,803,952 | Upton et al. | May 5, 1931 |
| 1,902,970 | Ramsaur et al. | Mar. 28, 1933 |
| 2,189,888 | Endsley | Feb. 13, 1940 |
| 2,279,037 | Endsley | Apr. 7, 1942 |

FOREIGN PATENTS

| Number | Country | Date |
| --- | --- | --- |
| 317,521 | France | of 1902 |